(12) United States Patent
Baek et al.

(10) Patent No.: US 11,178,572 B2
(45) Date of Patent: Nov. 16, 2021

(54) METHOD AND DEVICE FOR PROCESSING MAC LAYER HEADER

(71) Applicant: Samsung Electronics Co., Ltd., Suwon-si (KR)

(72) Inventors: Sangkyu Baek, Yongin-si (KR); Donggun Kim, Seoul (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 16/622,357

(22) PCT Filed: Jun. 12, 2018

(86) PCT No.: PCT/KR2018/006623
§ 371 (c)(1),
(2) Date: Dec. 13, 2019

(87) PCT Pub. No.: WO2018/230919
PCT Pub. Date: Dec. 20, 2018

(65) Prior Publication Data
US 2020/0205033 A1  Jun. 25, 2020

(30) Foreign Application Priority Data
Jun. 15, 2017 (KR) .................. 10-2017-0076159

(51) Int. Cl.
*H04W 4/00* (2018.01)
*H04W 28/06* (2009.01)
*H04W 80/02* (2009.01)

(52) U.S. Cl.
CPC .......... *H04W 28/065* (2013.01); *H04W 80/02* (2013.01)

(58) Field of Classification Search
None
See application file for complete search history.

(56) References Cited

U.S. PATENT DOCUMENTS

| | | |
|---|---|---|
| 2007/0133579 A1 | 6/2007 | Kim |
| 2007/0189304 A1 | 8/2007 | Rosa |
| 2008/0137573 A1 | 6/2008 | Cave et al. |
| 2009/0103511 A1* | 4/2009 | Marinier ............ H04W 28/065 370/345 |
| 2009/0219911 A1 | 9/2009 | Blankenship et al. |
| 2010/0128741 A1 | 5/2010 | Agiwal et al. |
| 2011/0085508 A1 | 4/2011 | Wengerter et al. |
| 2012/0057547 A1* | 3/2012 | Lohr ................... H04L 5/0064 370/329 |

(Continued)

FOREIGN PATENT DOCUMENTS

KR  10-2010-0061370 A  6/2010

OTHER PUBLICATIONS

ISA/KR, International Search Report and Written Opinion of the International Searching Authority, International Application No. PCT/KR2018/006623, dated Nov. 7, 2018, 12 pages.

*Primary Examiner* — Elisabeth Benoit Magloire

(57) ABSTRACT

The present disclosure relates to a communication technique for convergence of a 5G communication system for supporting a higher data transmission rate beyond a 4G system with an IoT technology, and a system therefor. The present invention provides a method and device for reducing overhead by processing a header in an MAC layer.

12 Claims, 16 Drawing Sheets

(56) References Cited

U.S. PATENT DOCUMENTS

| | | | |
|---|---|---|---|
| 2012/0120886 A1* | 5/2012 | He | H04W 52/12 |
| | | | 370/329 |
| 2013/0039393 A1* | 2/2013 | Choi | H04L 1/1835 |
| | | | 375/219 |
| 2015/0334703 A1* | 11/2015 | Xu | H04L 1/0002 |
| | | | 370/253 |
| 2016/0226643 A1* | 8/2016 | Mallik | H04L 1/0089 |
| 2016/0233999 A1* | 8/2016 | Kannan | H04L 1/1621 |
| 2019/0104551 A1* | 4/2019 | Deenoo | H04W 76/28 |

\* cited by examiner

FIG. 6

| G0 | G1 | G2 | G3 | G4 | G5 | G6 | G7 |
|----|----|----|----|----|----|----|----|
| Buffer Status of LCG1 ||||||||
| Buffer Status of LCG2 ||||||||
| Buffer Status of LCG4 ||||||||
| Buffer Status of LCG5 ||||||||

FIG. 12

| R | R | LCID | | | | | |
|---|---|---|---|---|---|---|---|
| G0 | G1 | G2 | G3 | G4 | G5 | G6 | G7 |

…

METHOD AND DEVICE FOR PROCESSING MAC LAYER HEADER

CROSS-REFERENCE TO RELATED APPLICATIONS

This application is a 371 National Stage of International Application No. PCT/KR2018/006623, filed Jun. 12, 2018, which claims priority to Korean Patent Application No. 10-2017-0076159, filed Jun. 15, 2017, the disclosures of which are herein incorporated by reference in their entirety.

BACKGROUND

1. Field

The disclosure relates to a wireless communication system and, in particular, to a method and apparatus for processing MAC layer headers.

2. Description of Related Art

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System".

Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system.

In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

Meanwhile, with the advance of communication systems, various types of research have been conducted to reduce data communication overhead. Reducing overhead in the MAC layer can be considered as an effective part of such efforts, which indicates an increasing need of methods for efficiently processing data in the MAC layer.

SUMMARY

The disclosed approach aims to reduce MAC control element (CE) transmission overhead caused by an increase of the size of a MAC CE.

The disclosed approach also aims to reduce overhead caused by segmenting packets.

According to an embodiment of the disclosure, a method of a transmitter in a wireless communication system includes allocating at least one packet to at least one logical channel, identifying whether a packet smaller in size than a transport block exists among packets allocated to a second logical channel based on a first packet allocated to a first logical channel being greater in size than the transport block, and transmitting, based on a second packet smaller in size than the transport block existing among the packets allocated to the second channel, the second packet in the transport block to a receiver.

According to an embodiment of the disclosure, an apparatus of a transmitter in a wireless communication system includes a transceiver and a controller configured to allocate at least one packet to at least one logical channel and identify whether a packet smaller in size than a transport block exists among packets allocated to a second logical channel based on a first packet allocated to a first logical channel being greater in size than the transport block and control the transceiver to transmit, based on a second packet smaller in size than the transport block existing among the packets allocated to the second channel, the second packet in the transport block to a receiver.

The disclosed embodiments are advantageous in terms of reducing overhead caused by MAC CE.

The disclosed embodiments are advantageous in terms of reducing overhead caused by packet segmentation.

BRIEF DESCRIPTION OF THE DRAWINGS

FIG. 6 is a diagram illustrating a structure of a buffer status report;

FIG. 12 is a diagram illustrating a MAC subheader structure including a bitmap;

DETAILED DESCRIPTION

Figure 1:
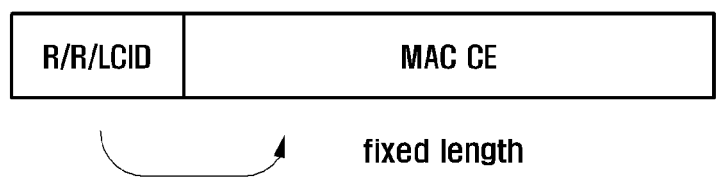
FIG. 1 is a diagram illustrating a structure of a MAC subheader having no L field and followed by a MAC CE.

Exemplary embodiments of the disclosure are described in detail with reference to the accompanying drawings. The same reference numbers are used throughout the drawings to refer to the same or like parts. Detailed descriptions of well-known functions and structures incorporated herein may be omitted to avoid obscuring the subject matter of the disclosure.

Detailed descriptions of technical specifications well-known in the art and unrelated directly to the disclosure may be omitted to avoid obscuring the subject matter of the disclosure. This aims to omit unnecessary description so as to make clear the subject matter of the disclosure.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the disclosure and methods of accomplishing the same may be understood more readily by reference to the following detailed descriptions of exemplary embodiments and the accompanying drawings. The disclosure may, however, be embodied in many different forms and should not be construed as being limited to the exemplary embodiments set forth herein; rather, these exemplary embodiments are provided so that this disclosure will be thorough and complete and will fully convey the concept of the disclosure to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams.

These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card.

FIG. 1 is a diagram illustrating a structure of a MAC subheader followed by a MAC control element (CE) having a fixed length.

If a MAC CE has a fixed size, the MAC subheader includes no length (L) field, and a logical channel identifier (LCID) field determines the length of the MAC CE field. If the LCID is set to a value indicative of a MAC CE having a fixed length, a receiver may perform processing based on the fixed length of the corresponding MAC CE under the assumption that there is no extra field.

Figure 2:
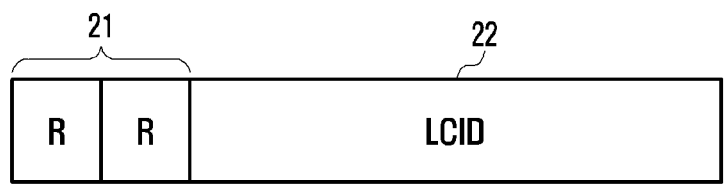
FIG. 2 is a diagram illustrating a detailed structure of the MAC subheader having no L field and followed by a MAC CE.

FIG. 2 is a diagram illustrating a detailed structure of the MAC subheader of FIG. 1 for the fixed length MAC CE.

In this case, the MAC subheader may have a length of 1 byte that consists of two 1-bit reserved (R) fields 21 and one 6-bit LCID field 22. The MAC subheader structured as shown in FIG. 2 may be followed by a fixed length MAC CE, a fixed length MAC service data unit (SDU), or a MAC CE variable in length and requiring no L field.

Figure 3:
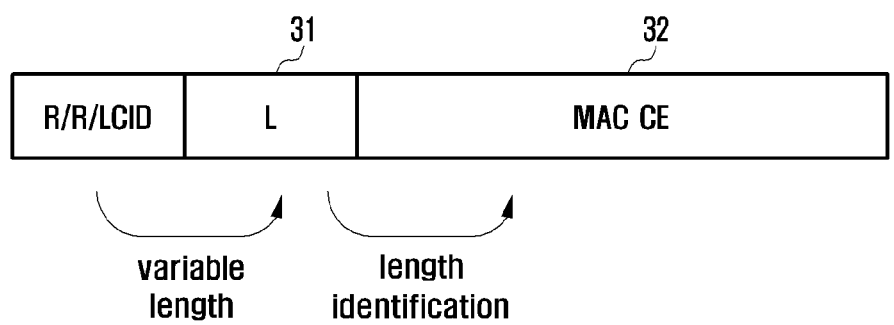
FIG. 3 is a diagram illustrating a structure of a MAC subheader having an L field and followed by a MAC CE.

FIG. 3 is a diagram illustrating a structure of a MAC subheader including an L field and followed by a MAC CE variable in length.

If the MAC CE 32 has a length that is variable and indicated by an L field, it may be possible to check the L field 31 included in the MAC subheader to identify the length of the MAC CE 32. If the LCID is set to a value indicating the MAC CE having a length that can be identified with the L field 31, it may be possible to check the L field 31 to identify the length of the MAC CE 32. A receiver may process the MAC CE based on the identified length.

Figure 4:
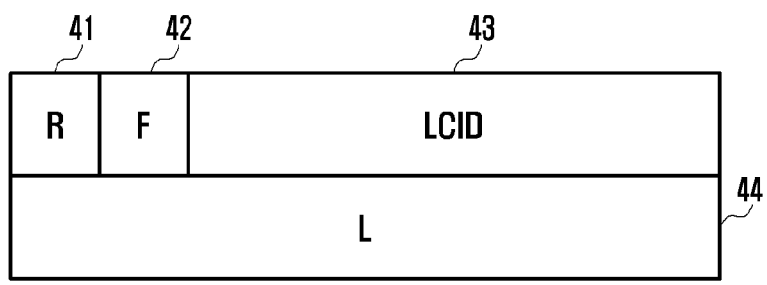
FIG. 4 is a diagram illustrating a detailed structure of a MAC subheader having an L field and followed by a MAC CE.

FIG. 4 is a diagram illustrating a detailed structure of the MAC subheader of FIG. 3 for the MAC CE having a variable length indicated by the L field.

Although depicted having the length of 2 bytes in FIG. 4, the MAC subheader may have a length equal to or greater than 2 bytes. The MAC subheader may include a 1-bit R field 41, a 1-bit F field 42, a 6-bit LCID field 43, and a 1- or 2-byte L field 44. The MAC subheader of FIG. 4 may be followed by a MAC CE requiring the L field 44 among MAC CEs variable in length or a MAC SDU variable in length.

Figure 5:
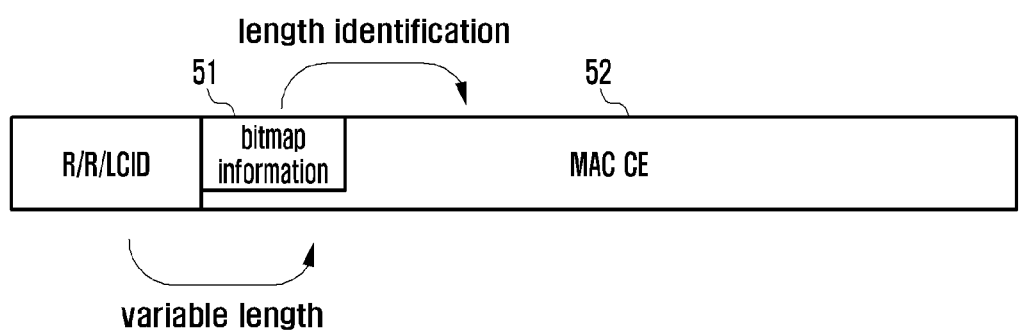
FIG. 5 is a diagram illustrating a structure of a MAC CE variable in length and requiring no L field.

FIG. 5 is a diagram illustrating a structure of a MAC CE that is variable in length and following a MAC subheader with no L field according to a disclosed embodiment.

Although the MAC CE is variable in length, it is possible to indicate the length of the MAC CE with a field included in the MAC CE itself without any L field indicating the length of the MAC CE.

For example, a buffer status report (BSR) as shown in FIG. 6 may be such a message. In the embodiment of FIG. 5, it is assumed that bitmap information 51 located at the beginning of the MAC CE 52 is read to proceed to determine the length of the MAC CE 52. If the bitmap information 51 is indicative of the total length of the MAC CE 52, this may obviate the need of the L field described in the embodiment of FIGS. 3 and 4.

FIG. 6 is a diagram illustrating a structure of a BSR for use of a MAC subheader with no L field according to an embodiment.

The BSR is transmitted to a base station to report a size of data stored in a buffer of a terminal per logical channel group (LCG). In the embodiment of FIG. 6, it is assumed that there are 8 LCGs, i.e., LCG0 to LCG7, in total. The first byte of the BSR consists of G0 to G7 bits indicating whether the buffer statuses corresponding to the LCGs, i.e., LCG0 to LCG7, are included in the BSR. A bit Gi corresponding to a logical channel group LCGi may be set to 1 for inclusion of the corresponding LCG buffer status and otherwise it may be set to 0. The corresponding bits may be set to reverse values (0/1) under a pre-agreement.

In the embodiment of FIG. 6, it is assumed that G1=G2=G4=G5=1 and G0=G3=G6=G7=0 to report the buffer statuses of LCG1, LCG2, LCG4, and LCG5. Accordingly, the G0 to G9 fields are followed by only the buffer status values for LCG1, LCG2, LCG4, and LCG5. Although it is assumed that 8 bits (1 byte) are designated for indicating per-LCG buffer status reports in the embodiment of FIG. 6, the bit length may vary and include reserved (R) fields or other information for matching the byte length.

Because G1, G2, G4, and G5 fields are each set to 1 and G0, G3, G6, and G7 fields are each set to 0, the total length of the BSR becomes 5 bytes including the first byte of the BSR and 4 bytes conveying the 4 LCG buffer statuses. That is, the length of the MAC CE can be identified by reading the first bytes G0 to G7 of the MAC CE. This means that the length of the MAC CE can be identified with the bitmap information of the first byte with no L field.

In this manner, the proposed method makes it possible to ascertain the length of a MAC CE using information included as part of the MAC CE with no L field depending on the type of the MAC CE.

Figure 7:
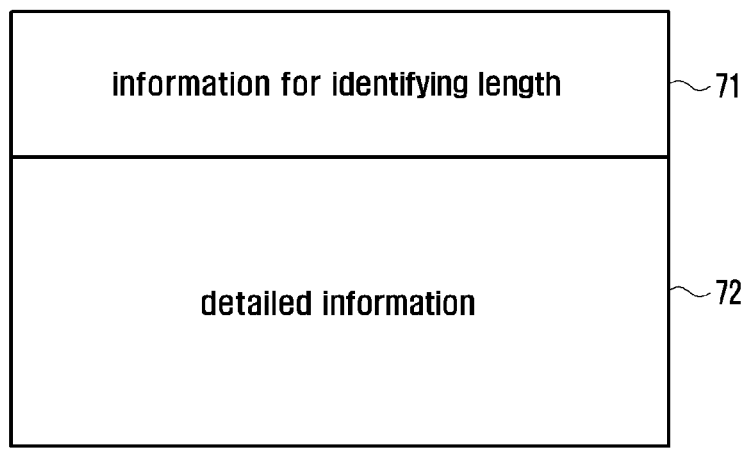
FIG. 7 is a diagram illustrating a MAC CE structure for use of a MAC subheader with no L field.

FIG. 7 is a diagram illustrating a MAC CE structure for use of a MAC subheader with no L field according to an embodiment.

Similar to the BSR in the embodiment of FIG. 6, the length of the entire MAC CE including detailed information 72 may be identified, by reading information for identifying the length 71 located at the beginning of the MAC CE. This obviates the need of the L field in the MAC subheader.

Figure 8:
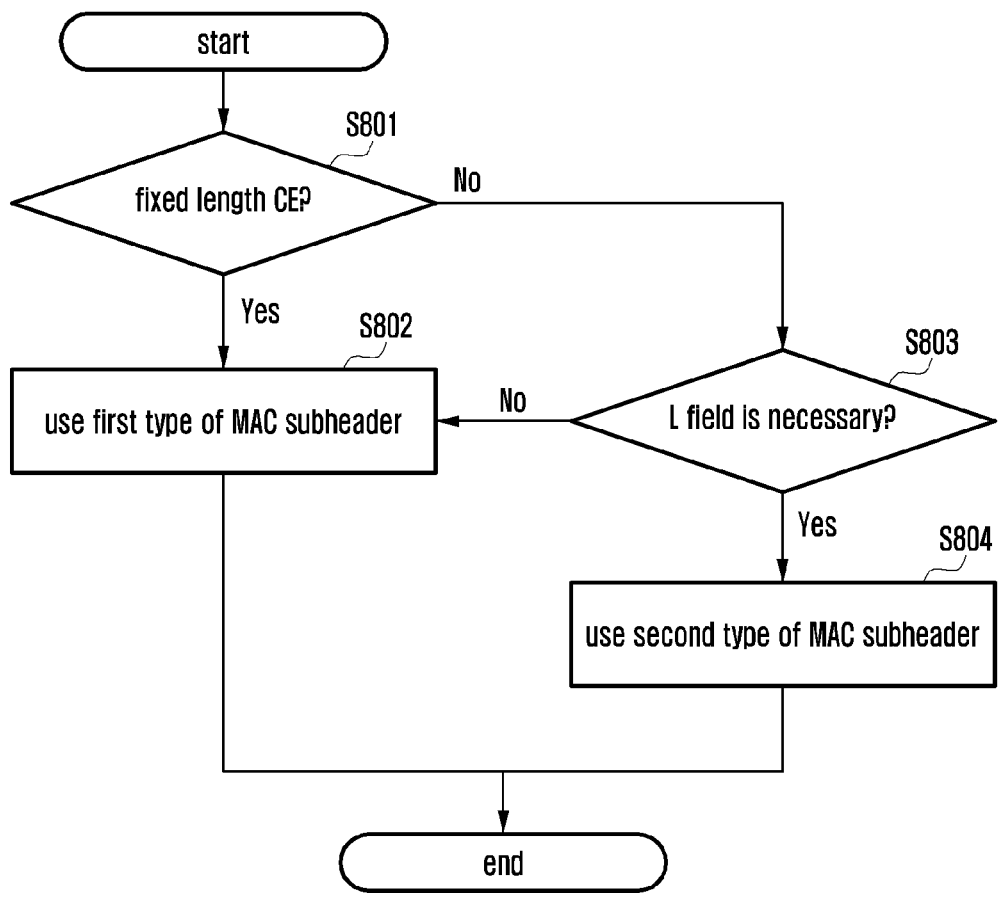
FIG. 8 is a flowchart illustrating a MAC CE processing procedure of a transmitter according to an embodiment.

FIG. 8 is a flowchart illustrating a MAC CE processing procedure of a transmitter according to an embodiment.

Here, the MAC CE processing procedure of the transmitter may include creating a MAC subheader for transmitting a MAC CE and including the MAC subheader in a transport block or MAC protocol data unit (PDU). There may be two MAC subheader structures.

The first structure may be of the MAC subheader without an L field as shown in FIG. 2. This subheader may be called an R/R/LCID subheader according to an embodiment. The second structure may be of the MAC subheader with an L field as shown in FIG. 4. This subheader may be called an R/F/LCID/L subheader or R/R/LCID/F/L subheader. Detailed locations of the fields may determine the name of the subheader.

According to an embodiment of the disclosure, the transmitter may determine at step S801 whether a MAC CE to be processed is a fixed-length CE. If the MAC CE to be processed is the fixed-length CE, the transmitter may use the first type of MAC subheader at step S802 such that the length of the MAC CE is identified by the LCID. If the MAC CE to be processed is a variable-length CE, the transmitter may determine at step S803 whether an L field is necessary. For example, if the MAC CE is variable in length and requiring the L field, the transmitter may use the second type of MAC subheader at step S804. If the MAC CE is variable in length and requiring no L field, the transmitter may use the first type of MAC subheader at step S802.

Figure 9:
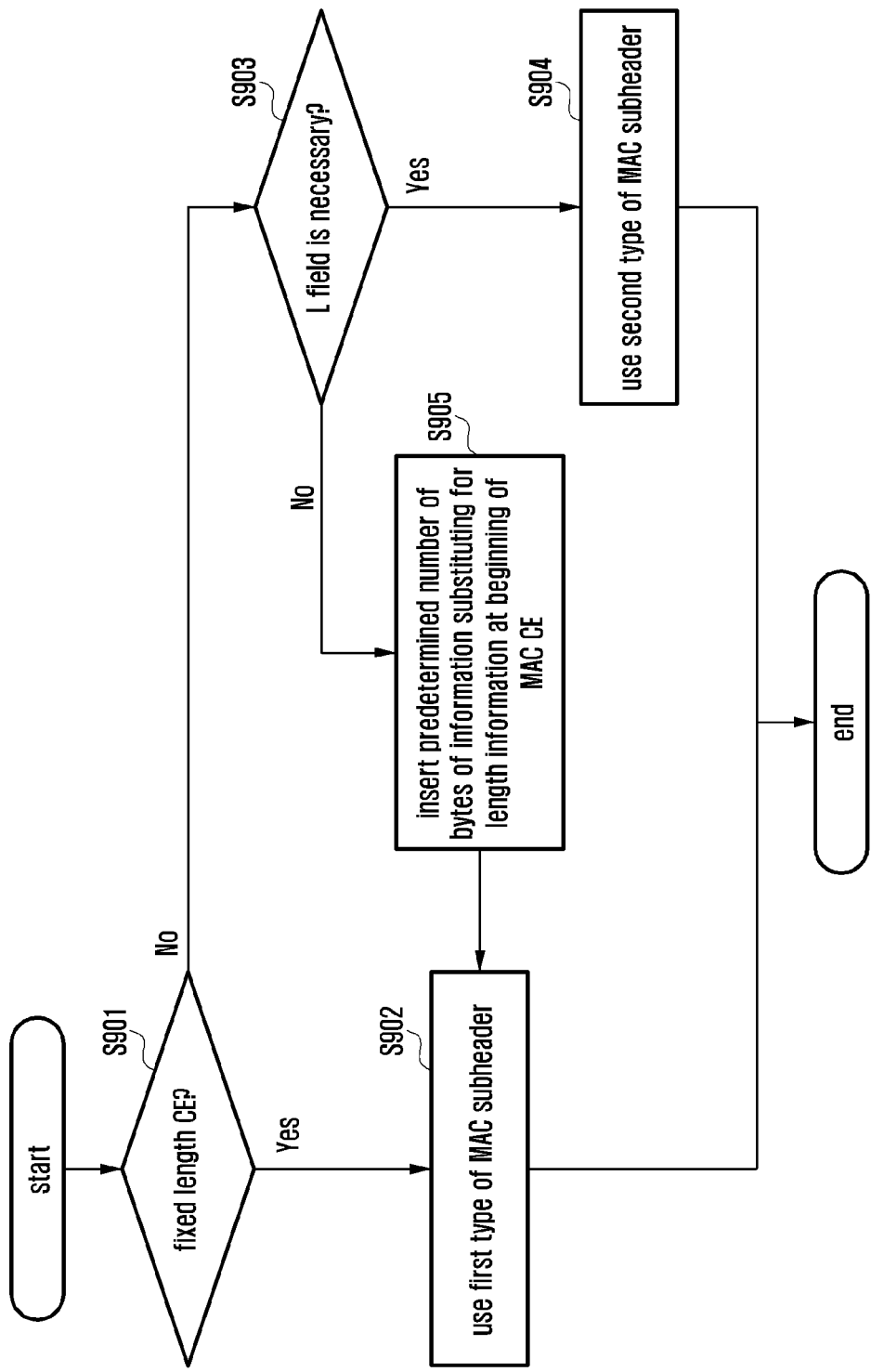
FIG. 9 is a flowchart illustrating a MAC CE processing procedure of a transmitter according to another embodiment.

FIG. 9 is a flowchart illustrating a MAC CE processing procedure of a transmitter according to another embodiment.

Here, the MAC CE processing procedure of the transmitter may include creating a MAC subheader for transmitting a MAC CE and including the MAC subheader in a transport block (TB) or MAC protocol data unit (PDU). There may be two MAC subheader structures.

The first structure may be of the MAC subheader with no L field as shown in FIG. 2. This subheader may be called an R/R/LCID subheader according to an embodiment. The second structure may be of the MAC subheader with an L field as shown in FIG. 4. This subheader may be called an R/F/LCID/L subheader or R/R/LCID/F/L subheader. Detailed locations of the fields may determine the name of the subheader.

According to an embodiment of the disclosure, the transmitter may determine at step S901 whether a MAC CE to be processed is a fixed-length CE. If the MAC CE to be processed is the fixed-length CE, the transmitter may use the first type of MAC subheader at step S902 such that the length of the MAC CE is identified by the LCID. If the MAC CE to be processed is a variable-length CE, the transmitter may determine at step S903 whether an L field is necessary. For example, if the MAC CE is variable in length and requiring the L field, the transmitter may use the second type of MAC subheader at step S904. If the MAC CE is variable in length and requiring no L field, the transmitter may insert, at step S905, information for identifying the length, at the beginning of the MAC CE in order for a receiver to identify the length of the MAC CE. Next the transmitter may use the first MAC subheader structure including the LCID field indicating the type of the MAC CE.

Figure 10:
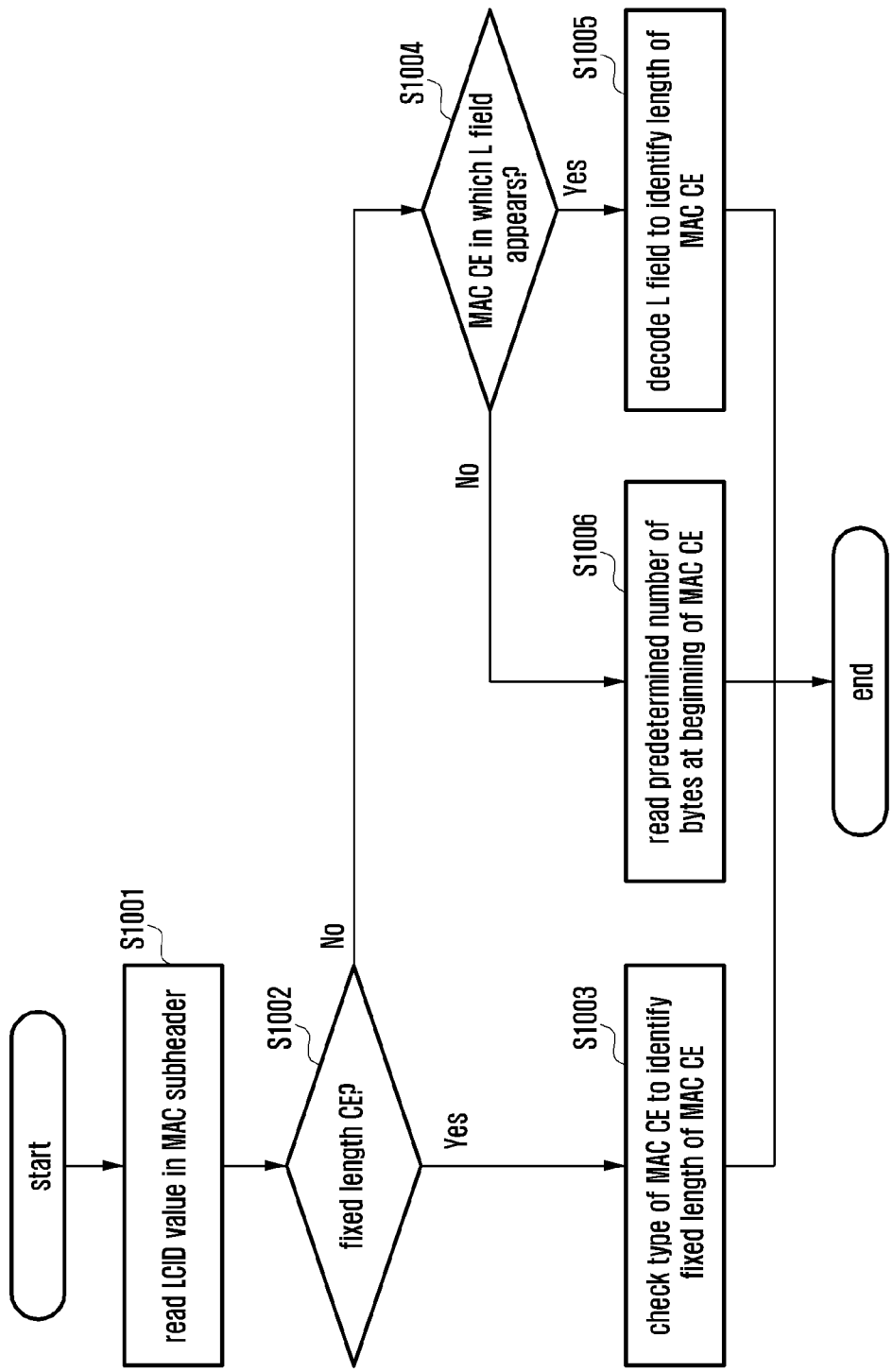
FIG. 10 is a flowchart illustrating a MAC CE processing procedure of a receiver according to an embodiment.

FIG. 10 is a flowchart illustrating a MAC CE processing procedure of a receiver according to an embodiment.

Here, the MAC CE processing procedure of the receiver may include reading fields of a MAC CE to interpret MAC CE information and performing a reception operation for the length of the MAC CE to interpret the MAC CE.

First, the receiver may read the LCID field of the MAC subheader at step S1001 to identify the type of the MAC CE. Next, the receiver may determine at step S1002 whether the MAC CE is a fixed-length MAC CE. If the MAC CE is the fixed-length MAC CE, the receiver may check for the fixed length of the MAC CE at step S1003 to interpret the MAC CE information. According to an embodiment, if the MAC CE is a variable-length MAC CE, the receiver may determine at step S1004 whether the MAC CE is a MAC CE in which an L field appears. For example, if the MAC CE requires an L field, the receiver may locate the L field in the MAC subheader and decode the L field to identify the length of the MAC CE at step S1005 and interpret information of the MAC CE. If the MAC CE is variable in length and requiring no L field, an L field is not located in the MAC subheader; thus, the receiver may read at step S1006 a predetermined number of bytes at the beginning of the MAC CE to identify the length of the MAC CE and interpret information of the MAC CE. Here, the predetermined number of bytes may be one or more bytes.

Figure 11:
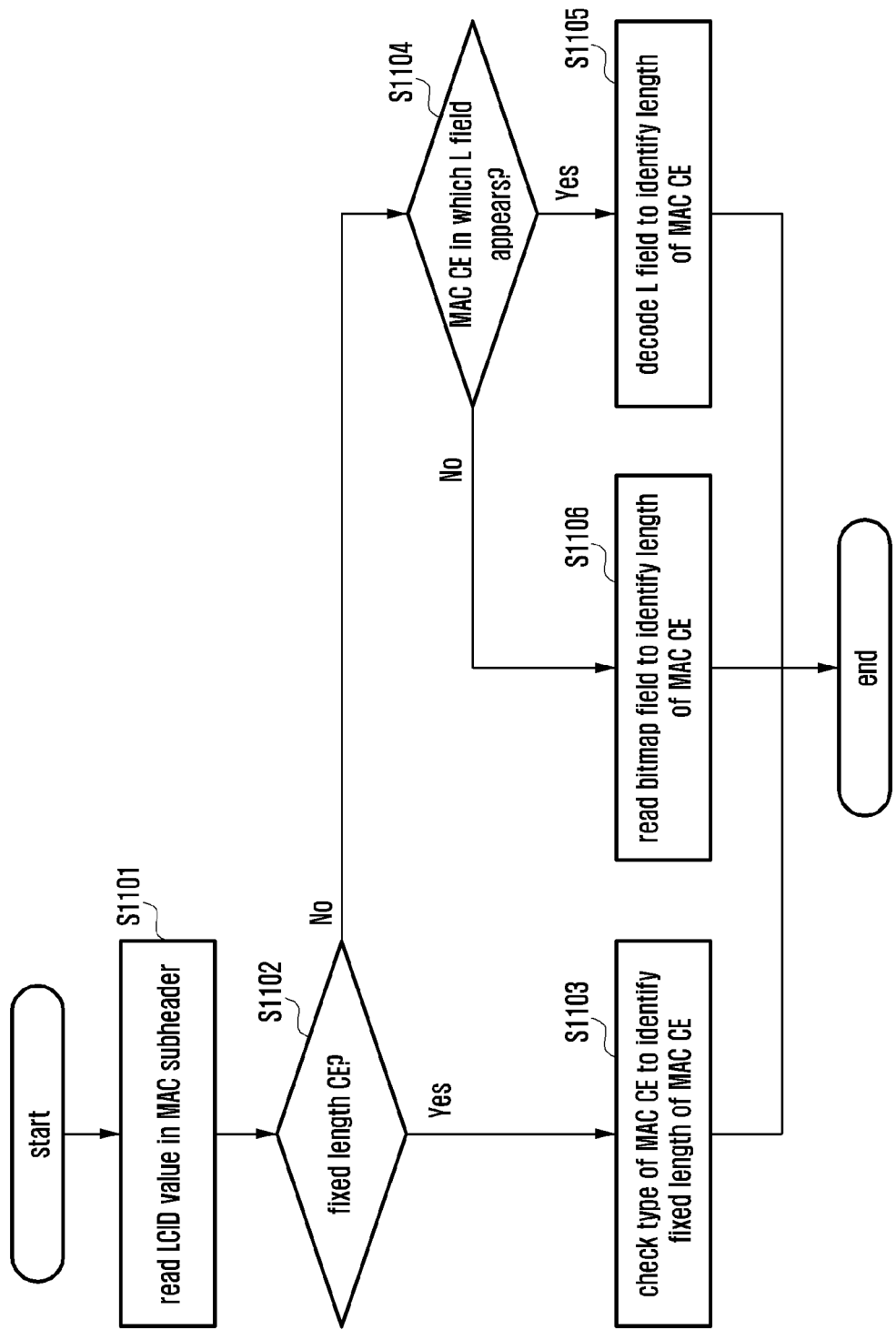
FIG. 11 is a flowchart illustrating a MAC CE processing procedure of a receiver according to another embodiment.

FIG. 11 is a flowchart illustrating a MAC CE processing procedure of a receiver according to another embodiment.

Here, the MAC CE processing procedure of the receiver may include reading fields of a MAC CE to interpret MAC CE information and performing a reception operation for the length of the MAC CE to interpret the MAC CE.

First, the receiver may read the LCID field of the MAC subheader at step S1101 to identify the type of the MAC CE. Next, the receiver may determine at step S1102 whether the MAC CE is a fixed-length MAC CE. If the MAC CE is the fixed-length MAC CE, the receiver may check for the fixed length of the MAC CE at step S1103 to interpret the MAC CE information. According to an embodiment, if the MAC CE is a variable-length MAC CE, the receiver may determine at step S1104 whether the MAC CE is a MAC CE in which an L field appears. For example, if the MAC CE requires an L field, the receiver may locate the L field in the MAC subheader and decode the L field to identify the length of the MAC CE at step S1105 and interpret information of the MAC CE. If the MAC CE is variable in length and requiring no L field, an L field is not located in the MAC subheader; thus, the receiver may read at step S1106 a bitmap field located in the MAC CE or MAC subheader to identify the length of the MAC CE and interpret information of the MAC CE. Here, the bitmap may have a length of one or more bytes.

Figure 12:
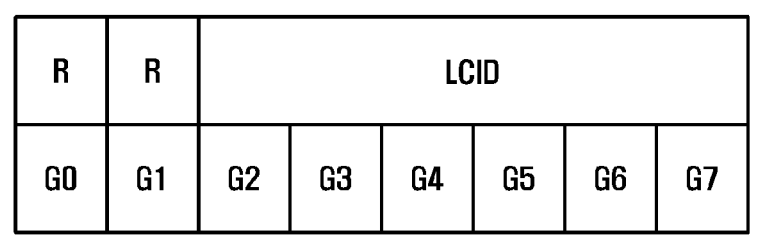

FIG. 12 is a diagram illustrating a MAC subheader structure including a bitmap according to an embodiment.

The bitmap information of FIG. 5 or 6 may be located in the MAC subheader rather than in the MAC CE. In this case, the transmitter may configure the bitmap indicative of the length of the MAC CE. The receiver may decode the bitmap information of the MAC subheader to acquire the information included in the MAC CE as well as the length of the MAC CE based on the decoded bitmap information.

Figure 13:
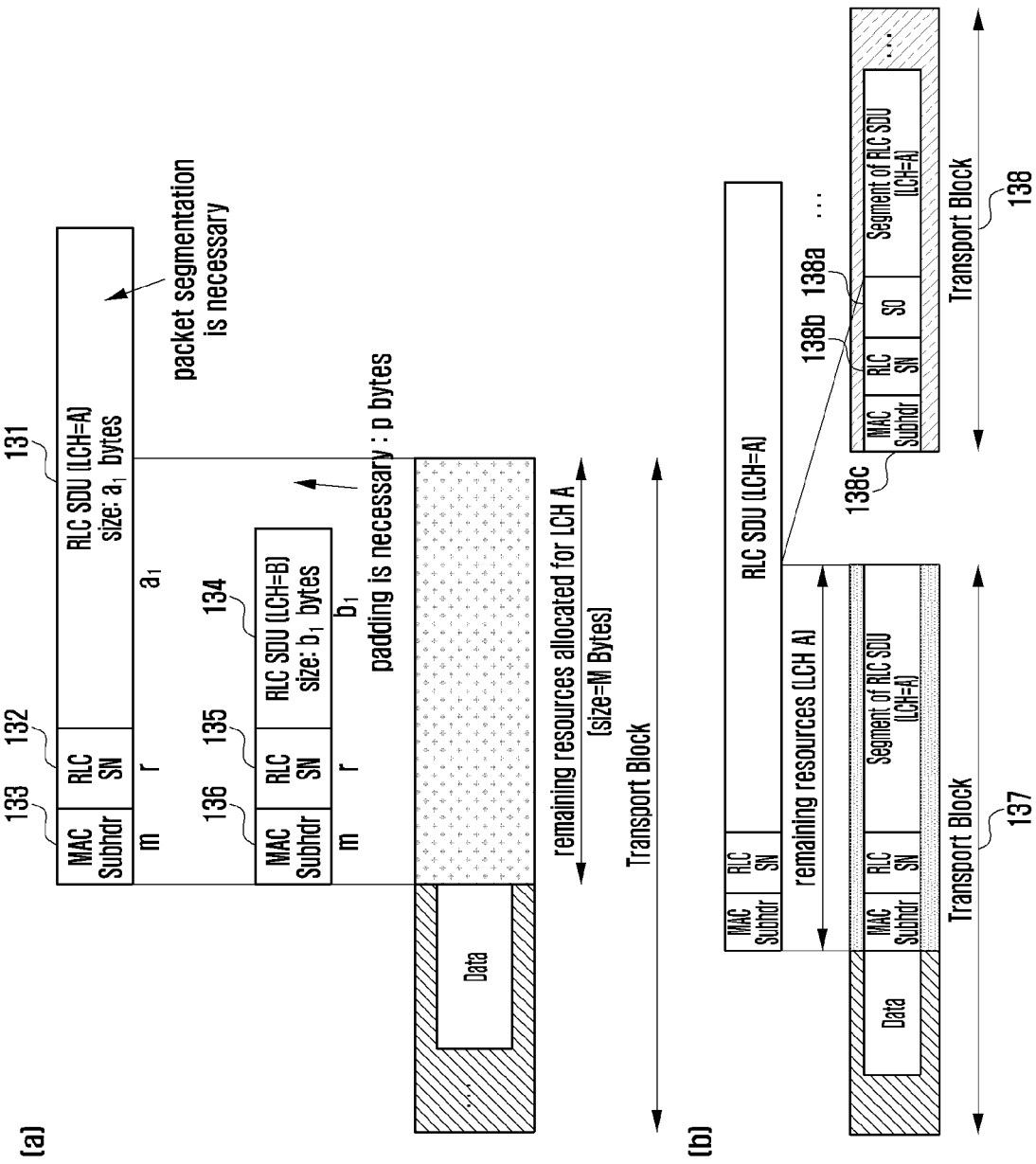
FIG. 13 is a diagram illustrating a scenario of transmitting data.

FIG. 13 is a diagram illustrating a scenario of transmitting data in a transport block or MAC PDU.

In part (a) of FIG. 13, it is assumed that M bytes of resources are remaining for a logical channel (LCH) A while stacking data after logical channel prioritization (LCP). Here, since a sum of a packet 131 (RLC SDU) of al bytes queued in a buffer of LCH A, an RLC header 132 (RLC SN part, fixed RLC header), and a MAC subheader 133 (Sub-hdr) is greater than M bytes, packet segmentation is required.

Meanwhile, since a sum of a packet 134 (RLC SDU) of b1 bytes queued in a buffer of LCH B, an RLC header, and a MAC subheader is not greater than M bytes such that the packet can be transmitted. If the sum of the b1 bytes, the RLC header 135, and the MAC subheader 136 is not exactly equal to but less than M bytes, the packet may need padding for transmission.

Part (b) of FIG. 13 shows segmenting the RLC SDU for LCH A under the assumption illustrated in part (a) of FIG. 13. The transmitter may segment the RLC SDU and fill one transport block 137 of M bytes with a MAC subheader, an RLC header, and part of the packet (segment of the RLC SDU) and another transport block 138 with the remaining part of the packet. Here, the transport block 138 may further include an SO field 138a indicating a segmentation point along with a MAC subheader 138b and an RLC header 138c (RLC SN part, fixed RLC header). The SO field 138a may be regarded as part of the RLC header 138b and inserted only when the packet is segmented.

As shown in part (b) of FIG. 13, if a packet is segmented, each of the MAC subheader 138c, RLC header 138b, and SO field 138 increases in number in proportion to a number of segments, which increases overhead. Accordingly, if there is a packet requiring no segmentation on a logical channel, it is preferable to transmit the packet in a transport block even though the logical channel is not allocated resources, thereby reducing overhead.

However, if the packet being inserted is too small, an excessive padding size may increase overhead. There is therefore a need of a condition for determining whether to include logical channel data for which resources are not allocated.

Figure 14:
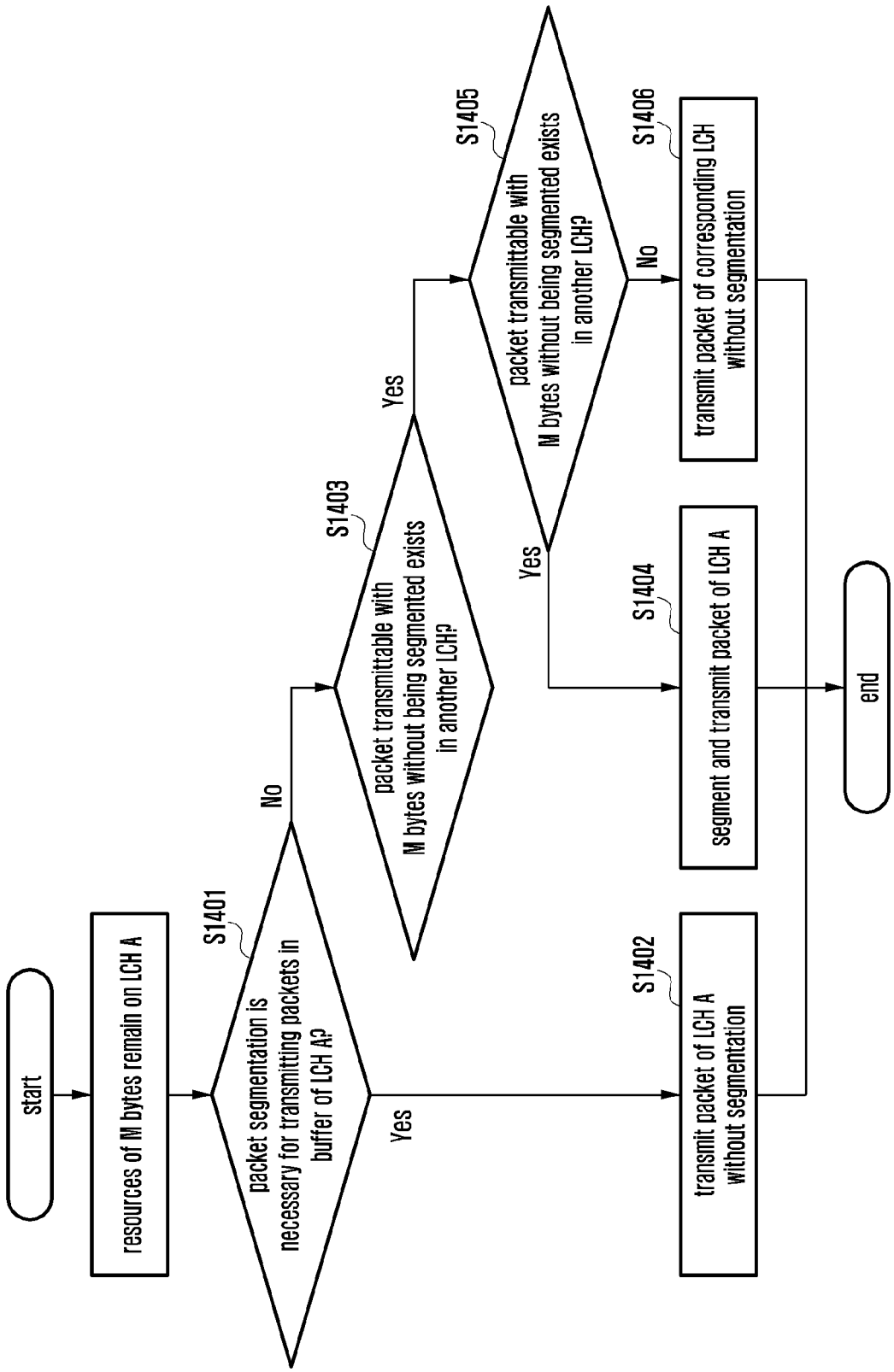
FIG. 14 is a flowchart illustrating a packet transmission procedure for a case where packet segmentation is not necessary.

FIG. 14 is a flowchart illustrating a packet transmission procedure for a case where packet segmentation is not necessary.

It is assumed that M bytes of resources allocated for LCH A are remaining in the procedure of LCP and mapping a packet into a transport block or a MAC PDU.

For example, a transmitter may determine at step S1401 whether a packet in a buffer of LCH A needs to be segmented for transmission.

If the packet in the buffer of LCH A can be transmittable with M bytes, the transmitter may transmit the corresponding packet at step S1402. If the packet in the buffer of LCH A cannot be transmittable with M bytes and needs to be segmented, the transmitter may determine at step S1403 whether there is a packet transmittable with the M bytes in a buffer of another LCH.

If there is no such a packet, the transmitter may segment, at step S1404, the packet in the buffer of LCH A and proceed to transmit the segmented packet. If there is a packet transmittable with the M bytes in the buffer of another LCH, the transmitter may determine at step S1405 whether an amount of padding to be inserted for transmitting the packet is greater than a threshold of p bytes. If the amount of the padding to be inserted for transmitting the packet is greater than the threshold of p bytes, the transmitter may segment the packet in the buffer of LCH A and proceed to transmit the segmented packet at step S1404. If the amount of the padding is equal to or less than the threshold of p bytes, the transmitter may transmit, at step S1405, the corresponding packet, which is not segmented.

The threshold value of p may be configured by a base station in a connection setup procedure or as preconfigured value. According to an embodiment, p may be set to a value equal to the sum of a length of an MAC subheader including an L field and a length of an RLC header including an SO field.

In the case where a packet on a resource-allocated logical channel is very large and a small number of transport blocks is assigned, the above procedure may delay resource allocation to a certain logical channel. In order to overcome this problem, it may be possible to use a timer which starts upon use of resources of another LCH to prevent the resources of the another LCH from being used until the timer expires. According to an alternative embodiment, it may be possible to prevent a predetermined number of consecutive packets from using resources of another logical channel.

Figure 15:
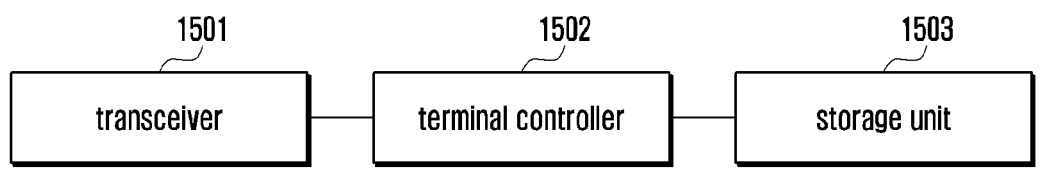
FIG. 15 is a block diagram illustrating a configuration of a terminal according to an embodiment of the disclosure.

FIG. 15 is a block diagram illustrating a configuration of a terminal according to an embodiment of the disclosure.

In reference to FIG. 15, the terminal may include a transceiver 1501, a terminal controller 1502, and a storage unit 1503. In the disclosed embodiment, the terminal controller 1502 may be defined as a circuit, an application-specific integrated circuit, or at least one processor.

The transceiver 1501 may communicate signals with network entities. For example, the transceiver 1501 may receive system information and synchronization signals or reference signals from a base station.

According to the disclosed embodiment, the terminal controller 1502 may control overall operations of the terminal. For example, the terminal controller 1502 may control signal flows among the components to implement the operations described with reference to the flowcharts. In detail, the terminal controller 1502 may process data packets in the MAC layer.

The storage unit 1503 may store at least one of information being transmitted/received by the transceiver 1501 and information generated by the terminal controller 1502.

Figure 16:
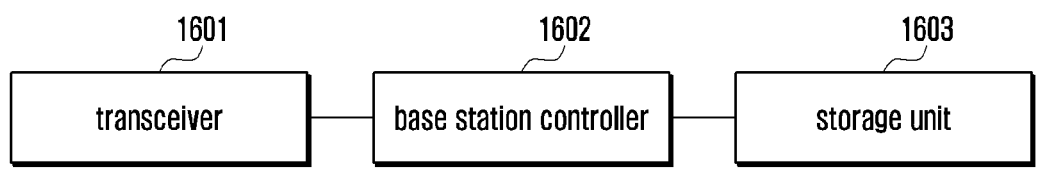
FIG. 16 is a block diagram illustrating a configuration of a base station according to an embodiment of the disclosure.

FIG. 16 is a block diagram illustrating a configuration of a base station according to an embodiment of the disclosure.

In reference to FIG. 16, the base station may include a transceiver 1601, a base station controller 1602, and a storage unit 1603. In the disclosed embodiment, the base station controller 1602 may be defined as a circuit, an application-specific integrated circuit, or at least one processor.

The transceiver 1601 may communicate signals with other network entities. For example, the transceiver 1601 may transmit system information and synchronization signals or reference signals to terminals.

According to the disclosed embodiment, the base station controller 1602 may control overall operations of the base station. For example, the base station controller 1602 may control the operations proposed in the disclosure to manage and reduce interference with neighboring base stations. In detail, the base station controller 1602 may process data packets in the MAC layer.

The storage unit 1603 may store at least one of information being transmitted/received by the transceiver 1601 and information generated by the base station controller 1602.

The embodiments disclosed in the specification and drawings are proposed to help explain and understand the present invention rather than to limit the scope of the present invention. Thus the scope of the disclosure should be interpreted to include the disclosed embodiments and all possible variations and modifications derived therefrom on the basis of the technical principle of the disclosure.

The invention claimed is:

1. A method of a transmitter in a wireless communication system, the method comprising:
   allocating at least one packet to at least one logical channel;
   identifying whether a second packet smaller in size than a transport block exists among packets allocated to a second logical channel based on a first packet allocated to a first logical channel being greater in size than the transport block;
   comparing a size of padding to be inserted for transmitting the second packet with a predetermined size, in case that the second packet exists;
   determining a packet to be included in the transport block based on a result of the comparison; and
   transmitting the determined packet in the transport block to a receiver.

2. The method of claim 1, further comprising:
   segmenting the first packet into at least one third packet based on the size of the padding being greater than the predetermined size; and
   including the at least one third packet in the transport block.

3. The method of claim 1, further comprising:
   including the second packet in the transport block based on the size of the padding being smaller than the predetermined size.

4. The method of claim 1, wherein the predetermined size is configured via a radio resource control (RRC) message.

5. The method of claim 1, further comprising:
   segmenting the first packet into at least one third packet based on non-existence of the second packet; and
   including the at least one third packet in the transport block.

6. The method of claim 1, further comprising transmitting the first packet in at least one next transport block subsequent to the transport block based on existence of the second packet.

7. An apparatus of a transmitter in a wireless communication system, the apparatus comprising:
   a transceiver; and
   a controller configured to:
      allocate at least one packet to at least one logical channel;
      identify whether a second packet smaller in size than a transport block exists among packets allocated to a second logical channel based on a first packet allocated to a first logical channel being greater in size than the transport block;
      compare a size of padding to be inserted for transmitting the second packet with a predetermined size, in case that the second packet exists;
      determine a packet to be included in the transport block based on a result of the comparison; and
      control the transceiver to transmit the determined packet in the transport block to a receiver.

8. The apparatus of claim 7, wherein the controller is configured to control to segment the first packet into at least one third packet based on the size of the padding being greater than the predetermined size and including the at least one third packet in the transport block.

9. The apparatus of claim 7, wherein the controller is configured to control to include the second packet in the transport block based on the size of the padding being smaller than the predetermined size.

10. The apparatus of claim 7, wherein the predetermined size is configured via a radio resource control (RRC) message.

11. The apparatus of claim 7, wherein the controller is configured to control to segment the first packet into at least one third packet based on non-existence of the second packet and include the at least one third packet in the transport block.

12. The apparatus of claim 7, wherein the controller is configured to control the transceiver to transmit the first packet in at least one next transport block subsequent to the transport block based on existence of the second packet.

* * * * *